United States Patent
Staudenmaier

(10) Patent No.: US 10,391,341 B2
(45) Date of Patent: Aug. 27, 2019

(54) EXTINGUISHING METHOD AND EXTINGUISHING DEVICE FOR INTRODUCING AT LEAST ONE EXTINGUISHING AGENT INTO A BATTERY

(71) Applicant: AUDI AG, Ingolstadt (DE)

(72) Inventor: Sascha Staudenmaier, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/493,476

(22) Filed: Apr. 21, 2017

(65) Prior Publication Data

US 2017/0304662 A1    Oct. 26, 2017

(30) Foreign Application Priority Data

Apr. 22, 2016   (DE) .................. 10 2016 206 851

(51) Int. Cl.
| | |
|---|---|
| *A62C 3/16* | (2006.01) |
| *H01M 2/10* | (2006.01) |
| *A62C 3/07* | (2006.01) |
| *A62C 31/22* | (2006.01) |
| *H01M 10/0525* | (2010.01) |

(52) U.S. Cl.
CPC .............. *A62C 3/16* (2013.01); *A62C 3/07* (2013.01); *A62C 31/22* (2013.01); *H01M 2/1077* (2013.01); *H01M 10/0525* (2013.01); *H01M 2200/00* (2013.01); *H01M 2220/20* (2013.01); *Y02E 60/122* (2013.01)

(58) Field of Classification Search
CPC ........... H01M 2/1077; H01M 10/0525; H01M 2200/00; H01M 2220/20; A62C 3/16

USPC ............................................... 169/46
See application file for complete search history.

(56) References Cited

U.S. PATENT DOCUMENTS 4,271,909 A * 6/1981 Chatfield, Jr. ......... A62C 31/22
                                                                  169/70
6,106,972 A * 8/2000 Kokubo ............ B60L 11/1874
                                                                  429/120
(Continued)

FOREIGN PATENT DOCUMENTS

| DE | 102008059948 A1 | 6/2010 |
|---|---|---|
| DE | 102008059968 A1 | 6/2010 |

(Continued)

OTHER PUBLICATIONS

Office Action dated Dec. 7, 2016 of corresponding application No. DE102016206851.2; 10 pgs.

*Primary Examiner* — Chee-Chong Lee
(74) *Attorney, Agent, or Firm* — Maier & Maier, PLLC

(57) ABSTRACT

A method for introducing at least one extinguishing agent into a battery, in particular into a high-voltage battery for a motor vehicle. The at least one extinguishing agent is introduced into a housing of the battery that is at least partially sealed against the penetration of water, in which a plurality of battery cells are arranged. For this purpose, a through-opening is created in a partial region of a wall of the housing, wherein the partial region is penetrated by means of an end region of an extinguishing device. At least one extinguishing agent is introduced into the housing of the battery through a supply channel of the extinguishing device. In addition, the invention relates to an extinguishing device.

10 Claims, 5 Drawing Sheets

(56) References Cited

U.S. PATENT DOCUMENTS

Figure 1:
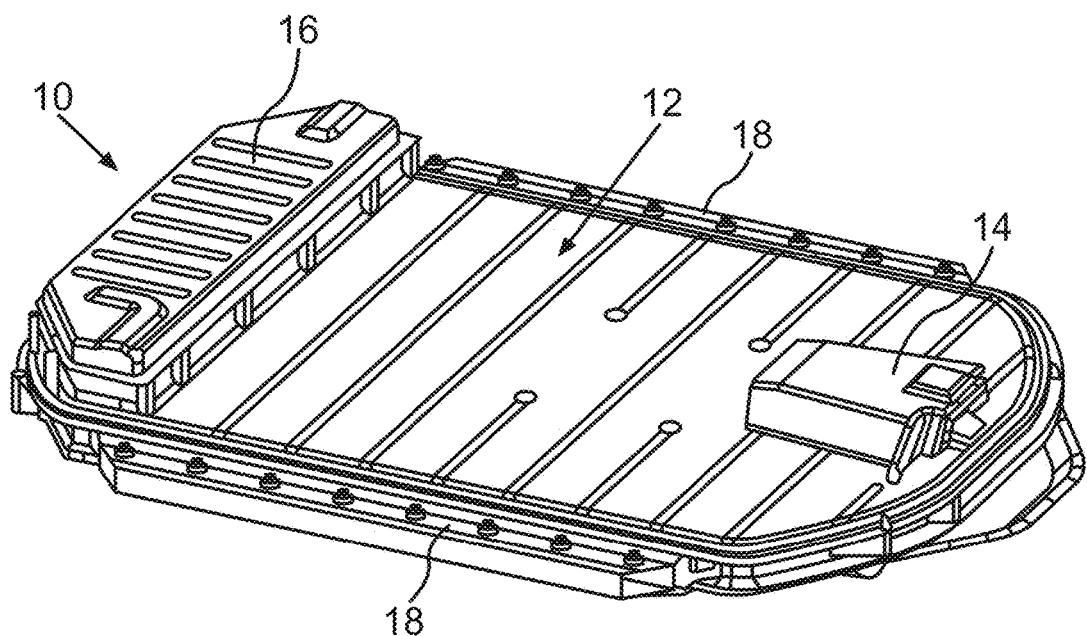

| | | | | |
|---|---|---|---|---|
| 6,225,785 B1* | 5/2001 | Au | ................... | G01R 31/3627 |
| | | | | 320/147 |
| 8,733,465 B1* | 5/2014 | Flood | ..................... | A62C 3/16 |
| | | | | 169/26 |
| 2002/0179307 A1* | 12/2002 | Schmidt | ................ | A62C 31/05 |
| | | | | 169/70 |
| 2003/0159837 A1 | 8/2003 | Itschner | | |
| 2015/0083446 A1 | 3/2015 | Fukuhara | | |
| 2016/0043368 A1 | 2/2016 | Kim | | |

FOREIGN PATENT DOCUMENTS

| | | |
|---|---|---|
| DE | 102013021416 A1 | 6/2015 |
| WO | 2013104351 A2 | 7/2013 |

\* cited by examiner

EXTINGUISHING METHOD AND EXTINGUISHING DEVICE FOR INTRODUCING AT LEAST ONE EXTINGUISHING AGENT INTO A BATTERY

The invention relates to a method for introducing at least one extinguishing agent into a battery, for example into a high-voltage battery for a motor vehicle. The at least one extinguishing agent is introduced into a housing of the battery which is at least partially sealed against the penetration of water. A plurality of battery cells are arranged in the housing. Furthermore, the invention relates to a fire extinguishing device for introducing an extinguishing agent into a battery.

DE 10 2013 021 416 A1 describes a high-voltage battery for a motor vehicle that is provided with a hermetically sealed housing, in which are accommodated galvanic cells. The housing comprises an interface for connecting an extinguishing device, through which the extinguishing agent can be introduced into the housing of the high-voltage battery. The interface can be provided with a screw lock, or with a bayonet lock, a plug connector, or a spring mechanism. In addition, another interface can be provided with pyrotechnic means if a predetermined accident signal or emergency signal is received via control lines.

Such a method is susceptible to errors, for example when as a result of an accident of the motor vehicle equipped with the high-voltage battery no accident or emergency signal can be received through the control like.

DE 10 2008 059 968 describes a method for operating a lithium-ion battery of a vehicle in which the interior of the battery is fluidically connected via an emergency line to extinguish fire of the individual cells of the battery to a refrigerant circuit and a refrigerant is introduced from the refrigerant circuit into the interior of the battery.

DE 10 2008 059 948 A1 describes a method for combating fire for a lithium-ion battery of a motor vehicle, wherein the interior of the battery is connected via an emergency line to an extinguishing agent storage device. In order to combat fire, the extinguishing agent is introduced from the extinguishing agent storage device into the interior space.

It is further known from prior art that a high-voltage battery of a motor vehicle, for example a lithium-ion battery, can be introduced into a so-called flood box that is filled with water. Such a flood box can be designed as an opening container, or as a box that can be closed with a lid. However, in the case of heavy high-voltage batteries that can weigh more than 700 kg, it is difficult to handle such a battery when introducing it into the flood box. In addition, there are also particularly large flood boxes that are provided with connections for water lines. The entire motor vehicle can be brought together with the battery brought inside such a flood box and then flooded. This kind of extinguishing of a battery can be realized when one or several battery cells react, which is to say for example when a so called thermal breakthrough occurs. In the case of a thermal breakthrough, an exothermic chemical reaction leads to a self-reinforcing, heat-producing process as a result of which a fire, let alone an explosion, then cannot occur.

When the entire motor vehicle is placed into the flood box, the disadvantage is that also the vehicle can be unnecessarily flooded and damaged in this manner, or even destroyed. Furthermore, the housing of the battery in which the individual battery cells are located is designed to be at least substantially waterproof, so that penetration of water into housing is prevented by the housing. It is thus impossible to determine whether water that was introduced into the flood box has penetrated at all into the housing of the battery, or how much water did penetrate into the housing of the battery. As long as the housing is sealed, the water in the flood box surrounds the housing of the battery so that heat absorption will only lead to a reduced heat dissipation in the environment of the flood box.

The object of the present invention is therefore to provide an improved method of the type mentioned in the preamble, as well as an extinguishing device suitable for carrying out this method.

This object is achieved with a method provided with the features of the patent claim 1 and with an extinguishing device having the features of patent claim 10. Advantageous embodiments provided with suitable further developments of the invention are described in the dependent patent claims.

With the method according to the invention for introducing at least one extinguishing agent into a battery, at least one extinguishing agent is introduced into the housing of the battery, which is at least partially sealed against the penetration of water. In the housing of the battery is arranged a plurality of battery cells. A through-opening is created in a partial region of a wall of the housing, wherein the partial region is pierced by means of an end region of an extinguishing device. An extinguishing agent is introduced into the housing of the battery already during the piercing operation and/or thereafter. The wall of the housing is thus destroyed, in particular in the partial region. Accessibility to the inner region of the housing is therefore provided in this manner for the extinguishing agent. This occurs by means of the extinguishing device, which is formed as a kind of a lance.

The battery, which can be in particular a high-voltage battery for a motor vehicle, for example a high-voltage battery having a plurality of lithium-ion battery cells, will therefore no longer be extinguished as a whole from outside or put into a flood box. Instead, the battery remains in its original state, or in its original location. Therein, the end region of the extinguishing device, which in particular has the form of a lance, is rammed into the housing and the partial region of the walls is thus penetrated.

Since at least one extinguishing device means is thus introduced into the interior of the housing, at least one extinguishing agent can exert its extinguishing or cooling effect in the immediate vicinity of the individual battery cells. The individual battery cells in the battery housing provide respectively a specific nominal voltage of a lithium-ion battery cell, such as the nominal voltage of a lithium-ion battery. Depending on the nature of the extinguishing agent, this can result for example in neutralization of the battery cells, namely with a targeted discharging of the cells, for example so that the battery cells are short-circuited with at least one extinguishing agent. The distinguishing agent thus also serves to interrupt the chain reaction accompanying the thermal occurrences, or the reaction itself, which is reinforced with regard to the heat emission.

The method can be employed particularly advantageously when a housing is provided that is completely sealed against the penetration of water. This is because when the extinguishing operation is conducted with such batteries from outside, the extinguishing agent cannot penetrate inside the battery housing. However, this is achieved with an extinguishing device provided with an end region that pierces through the partial region of the wall of the battery housing and thus creates a through-opening in the wall.

However, the method can also used with batteries that are provided with a completely sealed battery housing. The method is in particular useful when such a battery is built into a motor vehicle, for instance in the luggage compartment and as a result, areas of the housing which have unsealed locations are no longer easily accessible. In addition, in the case of such a battery, a considerably greater amount can be introduced into the interior of the battery housing with such an extinguishing device than what would be possible if the extinguishing agent was applied to such a battery from outside.

It is preferred when the end region of the extinguishing device is introduced into the housing so far as to avoid damaging the battery cell housing of the battery by the end region. Alternatively, although preferably additionally, the end region of the extinguishing device is introduced so far into the housing that a contact between a component conducting electrical current in the interior part of the housing of the battery and the end region is avoided. In other words, a non-hazardous location of the battery is preferably used in order to penetrate the partial region of the wall by the end region of the extinguishing device. Such a non-hazardous location may be also in particular marked. In addition, the extinguishing device can be provided with marking and/or a stop which ensures that the end region will not be inserted too far into the housing of the battery.

With a suitably stable design of the end region of the extinguishing device, for example when it is manufactured from metal, a housing that is usually formed from aluminum or from a plastic material, in particular a fiber-reinforced plastic, can be pierced in any location.

The piercing of the partial region can be performed in a particularly simple manner when a through-opening is created in a pressure compensation element arranged in the wall of the housing, wherein a membrane of the pressure compensation element is pierced by means of the end region. Such pressure compensation elements ensure that the pressure inside the housing of the battery can be adjusted to the ambient pressure. The membrane is therefore permeable to gas, but not to water, which means that the housing is safely sealed against water. The wall of the housing can be pierced particularly on such a pressure compensation element as long as the pressure compensation element is easily accessible.

It is preferred when the partial region of the wall is pierced with a tip of the end region of the extinguishing agent to create the through-opening. This is because the penetration of the partial region of the wall is facilitated with a tapered end of the end region.

In this case, at least one barb arranged at the end region secures the barb in the end region of the wall so that it will not be moved away from it. This makes it possible to ensure in a simple way that as a result of introducing at least one extinguishing agent into the housing under pressure, the it will not slip out again from the through-opening.

It is preferred when at least one extinguishing agent is introduced into the supply channel arranged in the interior of the end region. The end region can be also designed as a type of a cannula or as a hollow region. At least one extinguishing agent can be thus introduced into the housing in a very compact manner.

It is also advantageous when the extinguishing agent exiting from the housing of the battery is discharged into a return channel for the extinguishing agent that is arranged in the interior of the end region. In this manner it is possible to ensure that the pressure in the housing of the battery will not be increased too high, which could even burst or open the battery. In addition, an extinguishing agent that is supplied in excess to the through-opening can also exit from the housing in this manner. Therefore, cooling of the battery can be also provided when the heat of the extinguishing agent is absorbed and the heat is then discharged from the housing through the return channel.

It has also proven advantageous when an overpressure channel, which is designed for closing the return channel, is opened by the extinguishing agent exiting through the return channel into environment. This can be used to ensure that the pressure in the housing does not increase too much due to the effect of gravity, so that at least one extinguishing agent can be introduced into the housing of the battery while the pressure in the housing does not exceed the pressure at which the overpressure valve is opened. The overpressure channel can be opened in particular when an overpressure of approximately 0.1 bar is exceeded.

It is preferred when the extinguishing device is held with a handle provided for the extinguishing device, which is formed from an electrically insulating material surrounding the end region piece. In this manner, the end portion can be handled securely even if it is formed for example from metal. In addition, such a non-slip handle, which can be formed for example from a plastic material, facilitates handling of the extinguishing device, wherein the handle can be in particular arranged in a rear part of the end region.

The supply channel is preferably impacted with the extinguishing agent via a hose that is connected to at least one extinguishing agent. For this purpose, the hose is connected to an outlet of a shut-off device, so that the shut-off device is opened. Therefore, the shut-off device can be opened from a safe distance in order to introduce the extinguishing agent through the hose and further through the end region into the housing. The shut-off device can be a part of the extinguishing device, or it can be arranged at a corresponding storage device for the extinguishing agent, or at a line provided for the extinguishing agent.

For the at least one extinguishing agent is preferably used water. This is because water can not only absorb particularly well the heat that is released with the thermal leakage and thus provide for extinguishing or cooling of the battery, but also because in addition, water can be also used to achieve a targeted discharging of the battery cells. Moreover, water can be obtained easily and it is inexpensive.

However, it is also possible to use as an extinguishing agent in addition to water also powder, such as for example powders that are used in a fire extinguishing device, or gases that can be introduced into the housing of the battery. Carbon dioxide or inert gases such as argon are in particular preferred. This is because these gases do not influence the electrical characteristics of the battery cells, but only dissipate the heat. In addition, it is also possible to introduce different extinguishing agents via the extinguishing device into the housing, for instance gas at first, followed by water.

The extinguishing device according to the invention is designed for introducing at least one extinguishing agent into a battery, in particular into a high-voltage battery for a motor vehicle. Such a battery is provided with a housing that is at least partially sealed against penetration of water in which are arranged multiple battery cells. The battery extinguishing device has an end region that is designed so that a through-opening is created in a partial region of the wall of the housing of the battery. For this purpose, the end region of the extinguishing device can pierce through the partial region. In addition, the extinguishing device is provided with a supply channel through which at least one extinguishing agent can be introduced into the housing.

Improved extinguishing, cooling and neutralization can be achieved with such an extinguishing device, which is to say a targeted discharging of the batteries is attained, in particular of high-voltage batteries, which are provided with a plurality of lithium-ion battery cells.

The advantages of the method according to the method of the invention and its embodiments also apply to the extinguishing device according to the invention and vice versa.

The features and the combinations of features described above in the description, as well as the features and feature combinations shown below in the description of the figures and/or in the figures alone can be used not only in the particular combinations indicated here, but also in other combinations, or alone, without exceeding the scope of the invention. Therefore, embodiments that are not explicitly shown in the figures or described are also to be considered as being comprised in and disclosed by the invention, even if they are produced by means of separate feature combinations from the described embodiments. Embodiments and feature combinations that do not have the features originally formulated in the independent claims are thus also to be considered as being disclosed.

Figure 2:
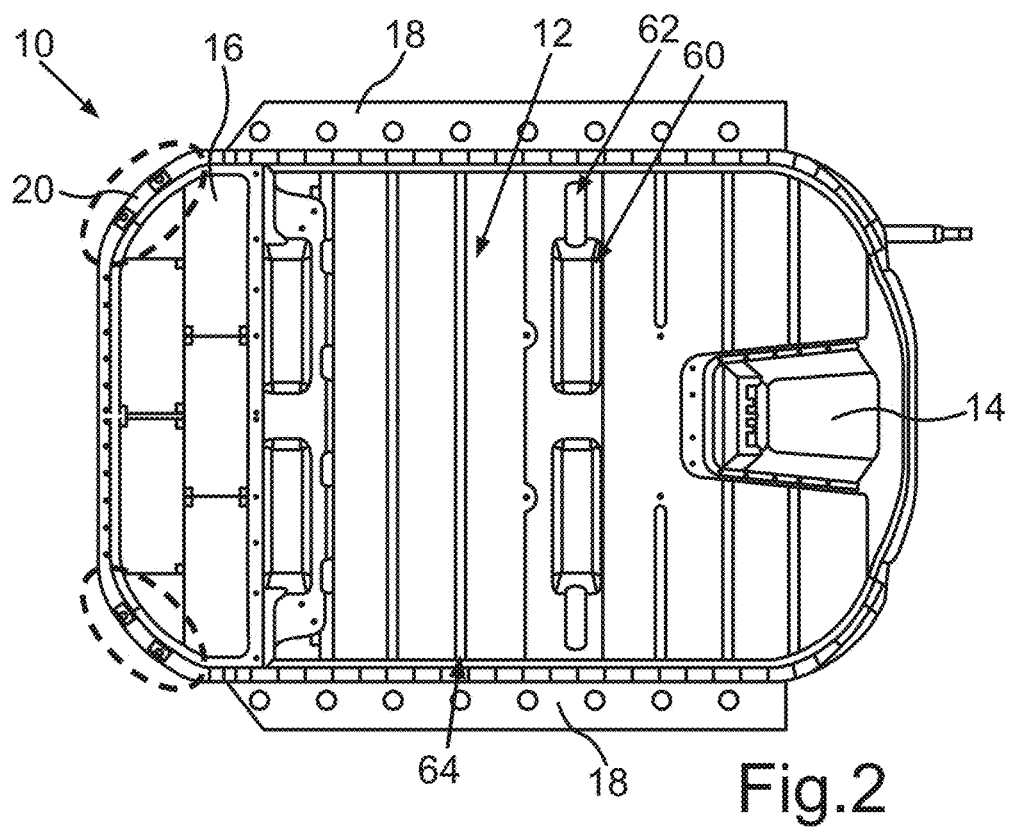
Figure 3:
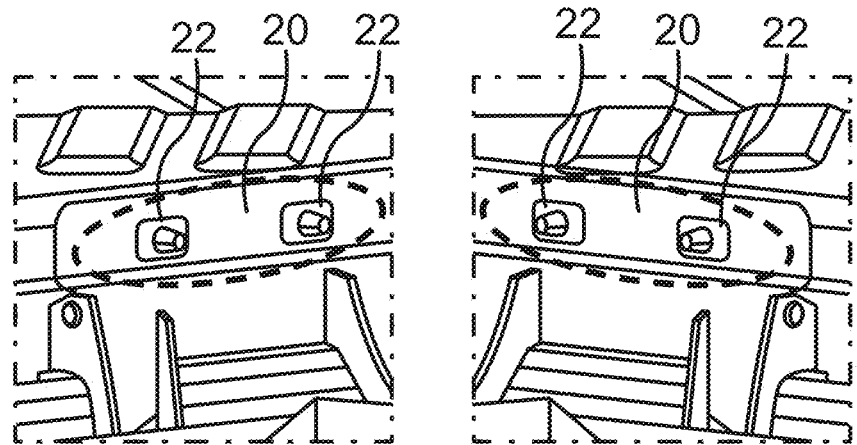
Figure 4:
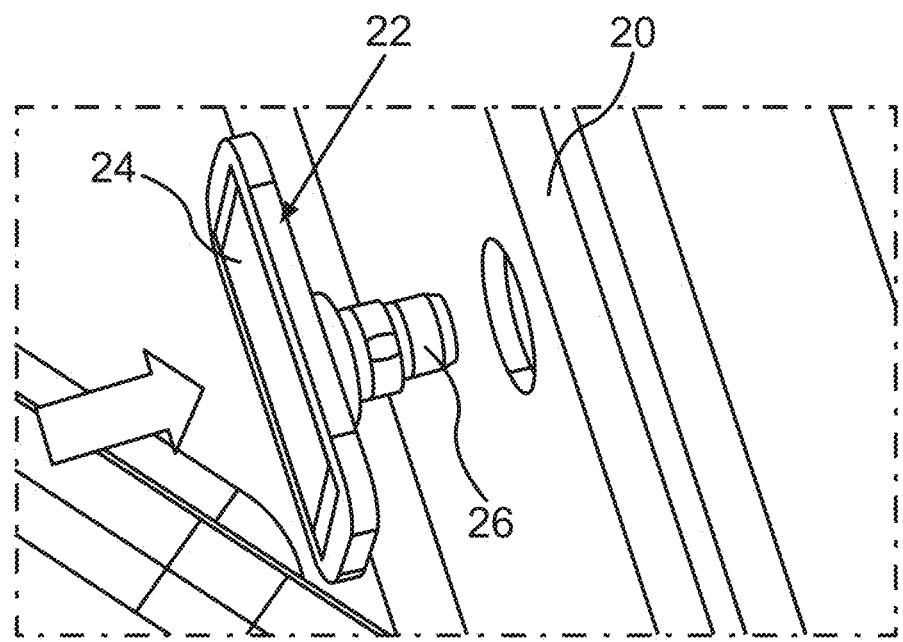
Figure 5:
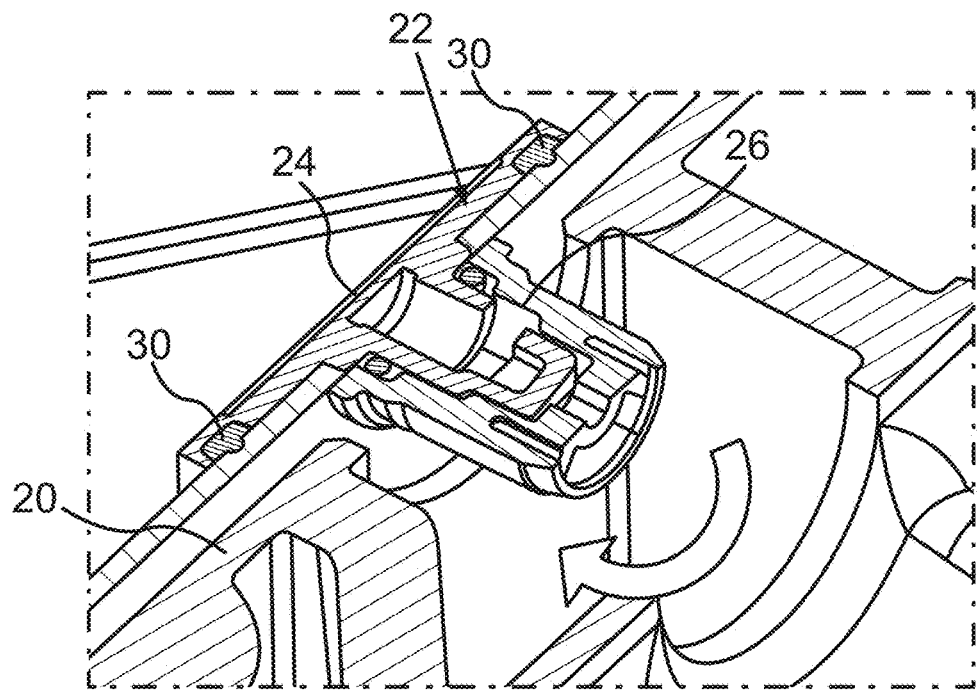
Figure 6:
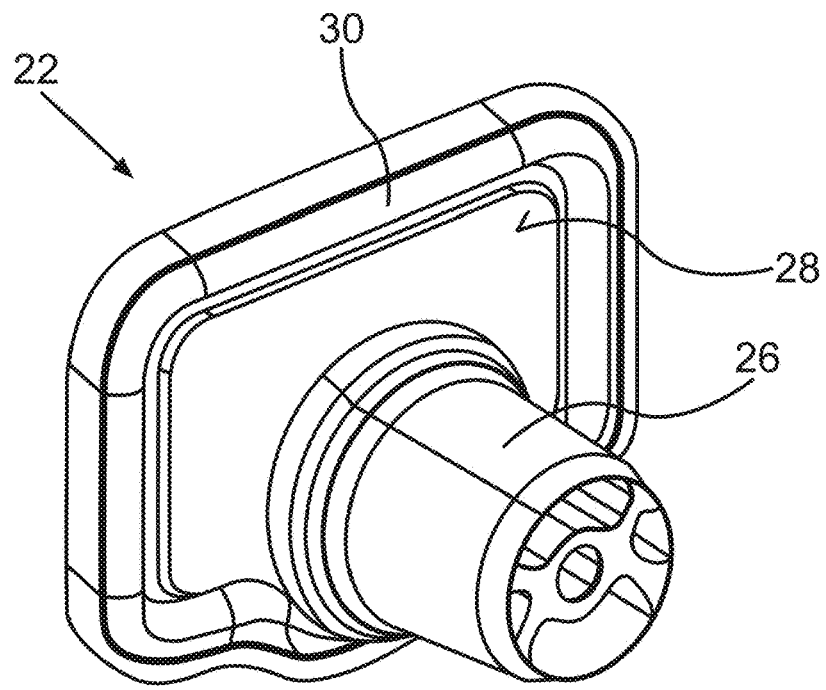
Figure 7:
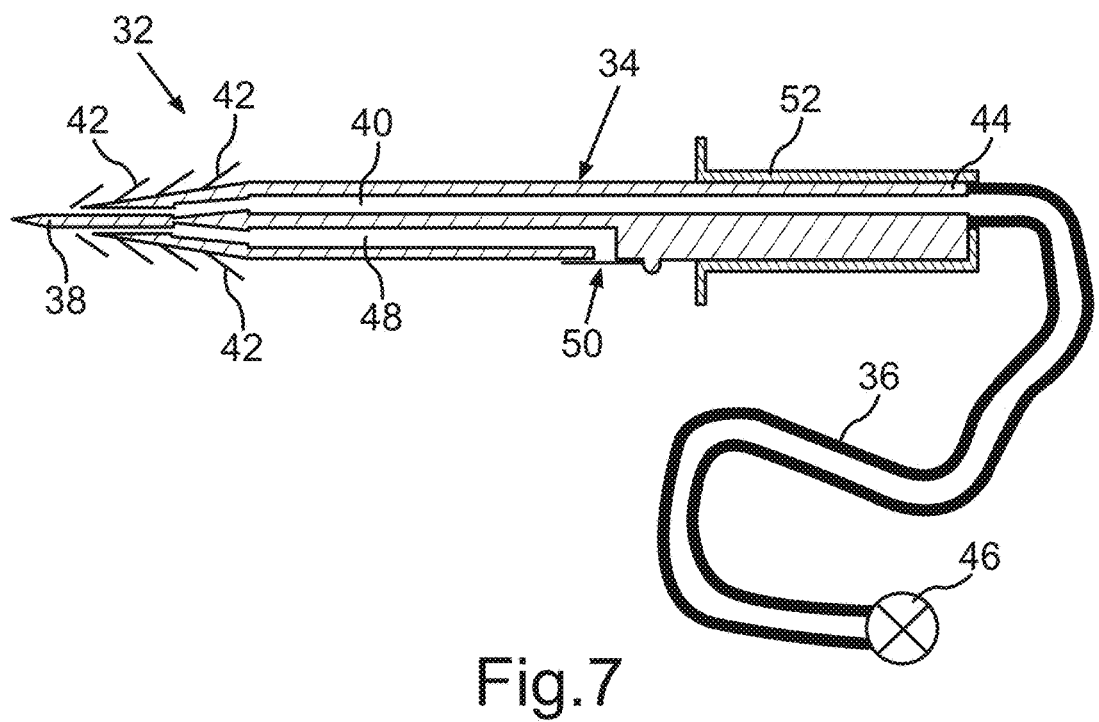
Figure 8:
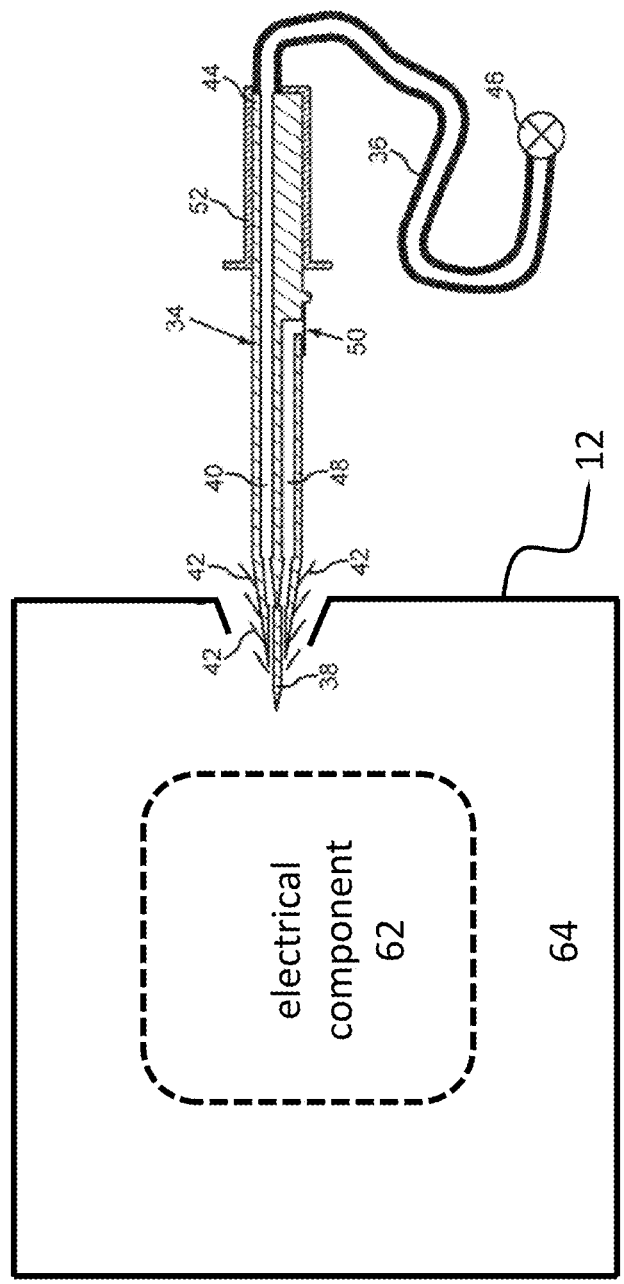

Further advantages, features and details of the invention will become evident from the claims and from the following description of preferred embodiments, as well as from the figures, which show the following:

FIG. 1 a perspective view of a lithium-ion high-voltage battery for a motor vehicle;

FIG. 2 the battery according to FIG. 1 in a top view, indicating the locations of the batteries in which the pressure compensation elements are located;

FIG. 3 regions of the wall of the housing according to FIG. 2, in which the pressure compensation elements are located;

FIG. 4 a perspective view of an example of a pressure compensation element before it is mounted on the wall of the housing of the battery;

FIG. 5 a mounted pressure element compensation element in a sectional view;

FIG. 6 the pressure compensation element in another perspective view;

FIG. 7 a schematic view of an extinguishing device by means of which an extinguishing agent, such as water, can be introduced into the housing of a battery;

FIG. 8 a schematic view of a housing of a battery into which the extinguishing device may be pierced in order to extinguish or cool it in a defined, non-hazardous location.

FIG. 1 shows schematic view of a battery 10 for a motor vehicle, which is designed as a high-voltage battery. Such high-voltage batteries are used as electrical energy storage devices for a drive motor, for example for an electrical motor vehicle of a hybrid vehicle. Accordingly, a plurality of individual lithium-ion battery cells 60 are arranged inside a housing 12, which are electrically connected by electrical connectors 62 in series and/or in parallel in order to provide the high voltages and currents required to drive a motor vehicle. The battery 10 is provided in the present case with a first region, in which is arranged a battery connection box 14. This battery connection box 14 is used to create a connection to electrical lines on the side of the motor vehicle and it usually contains a switch for interrupting or creating an electrically conductive connection or the like.

In another region 16, the battery 10 is provided with a region of the battery connection box 14 which is designed so that it is located higher relative to the battery 10. The battery 10 can thus be accommodated in an installation space in the region of the underside of the motor vehicle in a particularly suitable manner. Lateral structures 18 of the battery serve to secure the battery 10 to the body of the motor vehicle. The battery 10 indicated in FIG. 1 is shown here merely by way of an example, as different configurations and designs of such batteries 10 can be considered as high-voltage batteries for motor vehicles, such as for example for passenger cars.

As one can see from combining FIG. 2 with FIG. 3, in the region of a wall 20 of the housing 12 of the battery 10 are arranged pressure compensation elements 22. In the region of these pressure compensation elements 22, the housing 12, which is otherwise sealed against penetration of water, can be easier destroyed than in the regions of the housing 12 adjacent to the pressure compensation elements. This is because the pressure compensation elements 22 are provided with a membrane 24 (see FIG. 4) by means of which the pressure compensation between the interior of the housing 12 and the environment takes place.

As can be seen from FIG. 4, but also from FIG. 5 and FIG. 6, in order to attach the pressure compensation element 22 to the wall 29 of the housing 12, the pressure compensation element 22 can be provided with a bayonet cover 26 or a similar attachment element. However, numerous variants of the arrangement of the pressure compensation element 22 on the wall 20 are possible in the present example of the battery 10.

It is evident from FIG. 6 that a circumferential seal 30 is provided on one side 28 of the-pressure compensation element 22, which is facing one outer side of the wall 20 of the 12 of the battery 10.

It may happen that one or a plurality of lithium-ion battery cells of the high-voltage battery will start to overheat or even to burn as a result of a defect, or of a short-circuit or the like. Such a reaction of a lithium-ion battery cell, several of which are arranged inside the housing 12 of the battery 10, will be referred to as a thermal leakage. In this case, an exothermic chemical reaction leads to a self-reinforcing release of heat. In such a case, the battery 10 must be cooled or extinguished.

In order to accomplish this, an extinguishing device 32 is used in present case, which is designed as a lance 34 provided with a hose 36 that is attached to the lance (see FIG. 7). The lance 34 is driven into the battery 10 or into the energy storage device in order to extinguish or cool it in a defined, non-hazardous location, for example in the location 64 in which one of the pressure compensation elements 22 facilitates accessibility. The battery 10 is thus not extinguished in such a manner that the housing 12 of the battery 10 is impacted by water from outside, or in such a manner that water is introduced into a flood box or the like. Instead, the battery may remain in its original location during extinguishment, for example mounted on a stand during the manufacture of the battery 10, on a transport rack in which the battery 10 is transported to the motor vehicle, or in the state during which it is being installed in the motor vehicle.

When a pressure compensation element 22 that is made from a plastic material is provided, the lance 34 can be particularly easily driven into the housing 12 of the battery 10, wherein the wall 20 of the housing 12 s pierced in the region of the pressure element 22 and a through-opening is thus created in the wall 20 in this manner. This is done by means of a hard tip 38 of the lance 34. The hard tip 38 is preferably made of metal, so that when there is doubt whether the housing 12 of the battery 10 is formed from a plastic material or from an aluminum alloy, it can penetrate through the material even if none of the pressure compensation elements 22 is readily accessible.

A supply channel or feed 40 is located in the region of the lance 34 by means of which an end region of the extinguishing device 32. An extinguishing agent, for example water, can be introduced via this supply channel 40 into the interior of the housing 12 of the battery 10. In the region of the hard tip 38 of the lance 34 are further also preferably provided barbs 42. The barbs ensure that after the lance has penetrated through the wall 20 of the housing 12, in particular in the region of the pressure compensation element 22, it will remained hooked in this location and it can no longer slip out of the through-opening by means of the lance 34.

The hose 36 is connected to the lance 34 at the end 44 of the lance that is 34 located opposite the tip 38. The length of the hose ensures that water used for extinguishing the battery 10 can be turned on from a safe distance. Furthermore, it is preferred when a shut-off device is provided, for example in the form of a valve 46, by means of which access of the extinguishing agent is enabled so that water can be introduced downstream and at a spatial distance to the battery 10. Therefore, the extinguishing agent, in particular water, which is thus introduced through the hose 36 and further via the supply channel 40 into the housing 12 of the battery 10, will flood completely after the opening of the valve 46 the housing 12, specifically the interior thereof.

When the housing 12 is completely filled with water, water supplied further through the puncture created with the lance 34 can flow out in a defined manner. It is preferred when the lance 34 is provided for this purpose with a return or overflow channel 48. The return channel 48 is closed with a valve 50, which is designed as an overpressure valve. Accordingly, the valve 50 is open when the pressure inside the housing 12 of the battery 10 and thus also inside the return channel 48 exceeds a predetermined threshold value. For example, the valve 50 can be designed in such a way that it will be open with an overpressure of approximately 0.1 bar. This makes it possible for the water to rise even in a housing 12 of the battery 10 penetrated from below until the housing 12 can be completely filled up, without bursting of the housing 12 of the battery.

As soon as the water exits the return channel 48 with an open valve 50 into the surrounding area, a person operating the extinguishing device 32 will notice that the housing 12 of the battery 10 is completely filled with water. If the housing 12 of the battery 10 is still sealed and the temperature inside the housing 12 is no longer rising but instead falls, this means that there is a sufficient amount of water in the battery 10 for a targeted discharging of the battery cells. This is because the water ensures that the battery cells will be short-circuited, in particular due to the participation of the electrolyte that is released from the individual battery cells. Therefore, the lance 34 thus also ensures a neutralization, which is to say a targeted discharging of the individual battery cells located inside the housing 12 of the battery 10.

On the other hand, if the housing 12 of the battery 10 is not sealed and water is discharged from the housing 12 in other locations than in the location of the puncture that was created by means of the lance 34, the water level in the housing 12 of the battery 10 can be maintained constant by further supplying water and the temperature can thus be lowered. The same applies also in the case when the housing 12 of the battery is sealed and the temperature inside the housing 12 continues to rise.

It is preferred when a handle 52, which is made of an electrically insulating material surrounding a part of the end region formed in the lance 34, is provided at the region of the end 44 of the lance 34 to which the hose 36 is connected. This handle 52 is formed around the end of the lance 34, preferably in a partial region opposite the tip 38. Therefore, the lance 34 can be handled in a manner that is safe for the person carrying out the extinguishing operation involving extinguishing, cooling or neutralization of the battery 10.

In addition to water, powder or a gas such as for example carbon dioxide or argon can be also used as an extinguishing agent. However, water is particularly suitable for targeted discharging of the battery cells of the battery 10 and thus for neutralization of the battery 10. However, different types of extinguishing agents or media can be also supplied through the lance 34.

The invention claimed is:

1. A method for introducing at least one extinguishing agent into a battery, comprising:
    introducing the at least one extinguishing agent into a housing of the battery, which is at least partially sealed against the penetration of water and in which are arranged a plurality of battery cells,
    creating a through-opening in a partial region of a wall of the housing by piercing the wall of the housing with a lance of an extinguishing device; and,
    introducing the at least one extinguishing agent into the housing of the battery through a supply channel of the extinguishing device,
    wherein the battery further comprises a pressure compensation element arranged in the through-opening in the wall of the housing, and
    wherein the pressure compensation element comprises:
        a membrane configured to be destroyed by piercing of the lance;
        a circumferential seal configured to be provided on at least one side of the pressure compensation element facing at least one outer side of the wall of the housing; and
        a bayonet cover configured to be provided on the pressure compensation element so that the pressure compensation element attached on the wall of the housing.

2. The method according to claim 1, wherein the lance is inserted into the housing of the battery to a limited extent, such that insertion of the lance avoids at least one of damage to the respective battery cells of the battery cell housing by the lance, or contact between an electrical connector conducting electric current in an interior of the housing of the battery and the lance.

3. The method according to claim 1,
    wherein the creating of the through-opening further comprises piercing a membrane of the pressure compensation element with the lance.

4. The method according to claim 1, wherein the lance further comprises a barb, and
    wherein the step of piercing the wall of the housing with the lance further comprises arranging the barb so as to secure the lance against being removed from the wall.

5. The method according to claim 1, wherein the step of introducing at least one extinguishing agent into the housing of the battery further comprises discharging the extinguishing agent exiting from the housing of the battery via a return channel of the extinguishing device arranged in an interior of the lance.

6. The method according to claim 5, further comprising opening an overpressure valve by an extinguishing agent exiting into the surrounding environment through the return channel, the overpressure valve configured to close the return channel.

7. The method according to claim 6, wherein the overpressure valve is opened when an overpressure of 0.1 bar is exceeded.

8. The method according to claim 1, wherein the extinguishing device further comprises a handle, the handle formed from an electrically insulating material surrounding a part of the lance; and
   wherein operating the extinguishing device comprises holding the extinguishing device on the handle of the extinguishing device.

9. The method according to claim 1, wherein the supply channel is connected to a hose connected to the lance, wherein the hose is connected to an outlet of a shut-off device,
   wherein the step of introducing at least one extinguishing agent into the housing of the battery through the supply channel of the extinguishing device further comprises supplying extinguishing agent through the hose when the shut-off device is opened, and
   wherein the shut-off device is a valve.

10. The method according to claim 1, wherein the extinguishing agent comprises at least one of water, a powder, or a gas.

* * * * *